(12) United States Patent
Delaforce

(10) Patent No.: US 6,394,701 B1
(45) Date of Patent: May 28, 2002

(54) CABLE GUIDE FOR PIPES

(75) Inventor: Stephen Robert Delaforce, Loscoe (GB)

(73) Assignee: Lattice Intellectual Property Limited, London (GB)

( * ) Notice: Subject to any disclaimer, the term of this patent is extended or adjusted under 35 U.S.C. 154(b) by 0 days.

(21) Appl. No.: 09/508,082

(22) PCT Filed: Jan. 19, 1999

(86) PCT No.: PCT/GB99/00169

§ 371 Date: Mar. 13, 2000

§ 102(e) Date: Mar. 13, 2000

(87) PCT Pub. No.: WO99/40357

PCT Pub. Date: Aug. 12, 1999

(30) Foreign Application Priority Data

Feb. 5, 1998 (GB) .............................. 9802364

(51) Int. Cl.⁷ ..................... F16L 55/30; F16L 55/46
(52) U.S. Cl. ............... 405/183.5; 405/184; 405/184.1; 405/184.4; 138/97
(58) Field of Search ..................... 405/183.5, 184, 405/184.1, 184.2, 184.4, 174, 154.1; 138/97

(56) References Cited

U.S. PATENT DOCUMENTS

| 4,504,171 A | * | 3/1985 | Florence, Jr. ............ 405/184.2 |
| 4,832,069 A | * | 5/1989 | Gale et al. ................ 405/154.1 |
| 4,964,474 A | * | 10/1990 | Roesch .................... 405/154.1 |
| 5,139,751 A | * | 8/1992 | Mansfield et al. ........ 405/184.2 |
| 5,328,297 A | * | 7/1994 | Handford ..................... 405/184 |
| 5,364,207 A | * | 11/1994 | Reber et al. ............. 405/154.1 |
| 5,462,077 A | * | 10/1995 | Cohen et al. ............. 405/154.1 |
| 5,674,030 A | * | 10/1997 | Sigel ....................... 405/154.1 |

FOREIGN PATENT DOCUMENTS

| EP | 0 701 085 | * | 3/1996 |
| EP | 0 736 722 | * | 4/1996 |

* cited by examiner

*Primary Examiner*—David Bagnell
*Assistant Examiner*—Frederick L. Lagman
(74) *Attorney, Agent, or Firm*—Oblon, Spivak, McClelland, Maier & Neustadt, P.C.

(57) ABSTRACT

An apparatus which guides a cable through a conduit. The apparatus includes a guide device for receiving the cable. Passage of the cable through the guide device is permitted. Further, the guide device is automatically moved from a first position to a second position during passage of the cable into the conduit to assist in the movement of the cable along the conduit.

11 Claims, 5 Drawing Sheets

CABLE GUIDE FOR PIPES

BACKGROUND OF THE INVENTION

1. Field of the Invention

The invention relates to a cable guide suitable for use in existing pipes.

2. Discussion of the Background

It is necessary with existing pipelines to gain entry to the bore of the pipes to allow equipment to be towed through the pipeline for cleaning or inspection purposes for example as described in our copending patent application GB9724231.7.

SUMMARY OF THE INVENTION

According to the invention there is provided apparatus for guiding a cable or the like through a conduit and comprising a guide device for receiving a cable, means for allowing passage of the cable through the guide device and means for automatically moving the guide device from a first position to a second position during passage of the cable into the conduit to assist in the movement of the cable along the conduit.

Further according to the invention there is provided a method for guiding a cable or the like through a conduit and comprising passing the cable through a guide device lowering the guide device into the conduit and automatically moving the guide device from a first to a second position due to forces on the cable to assist in the movement of the cable along the conduit.

BRIEF DESCRIPTION OF THE DRAWINGS

The invention will now be described by way of example with reference to the accompanying drawings in which.

DESCRIPTION OF THE PREFERRED EMBODIMENTS

Figure 1:
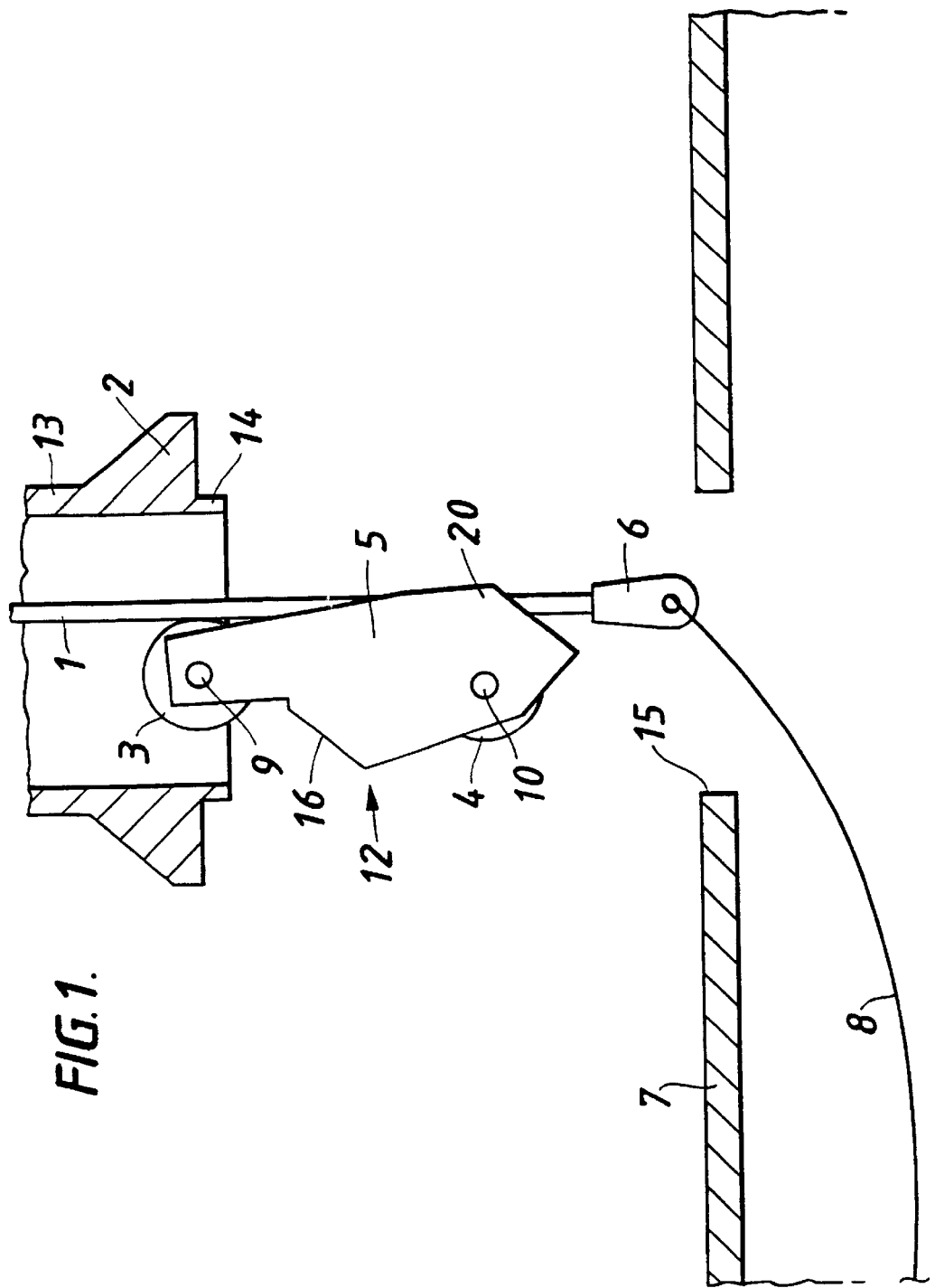
FIG. 1 shows the guide arrangement prior to insertion into the hole in the pipe.

The guide arrangement of FIG. 1 is utilised where there is a need to gain access to the bore of the pipe for one of a number of purposes, for example, cleaning or inspection.

In order to gain access into a sector of the pipeline two small holes are drilled in the pipe wall at either end and a lightweight threading wire passed therebetween using, for example, techniques disclosed in our copending patent application (Ref 4695). The wire 8 is then used to pull a more substantial tow cable 1, shown in FIG. 1, through the pipe to allow the desired operation to be carried out on the pipeline. A guide device 12 is used to assist in the tow cable deployment and comprises a body portion with two arms 5 supporting axles 9 and 10 carrying upper and lower pulleys 3 and 4. A retaining pin 20 also extends across the arms. The arms carry an angled face portion 16, which is approximately 45° to the vertical. The arms 5 are free to pivot about axle 9 which is affixed at either end to a tubular support 13. The support 13 carries a saddle 2 for resting on the exterior pipeline wall and includes extension 14 which is for abutting the aperture in the pipeline wall.

Figure 2:
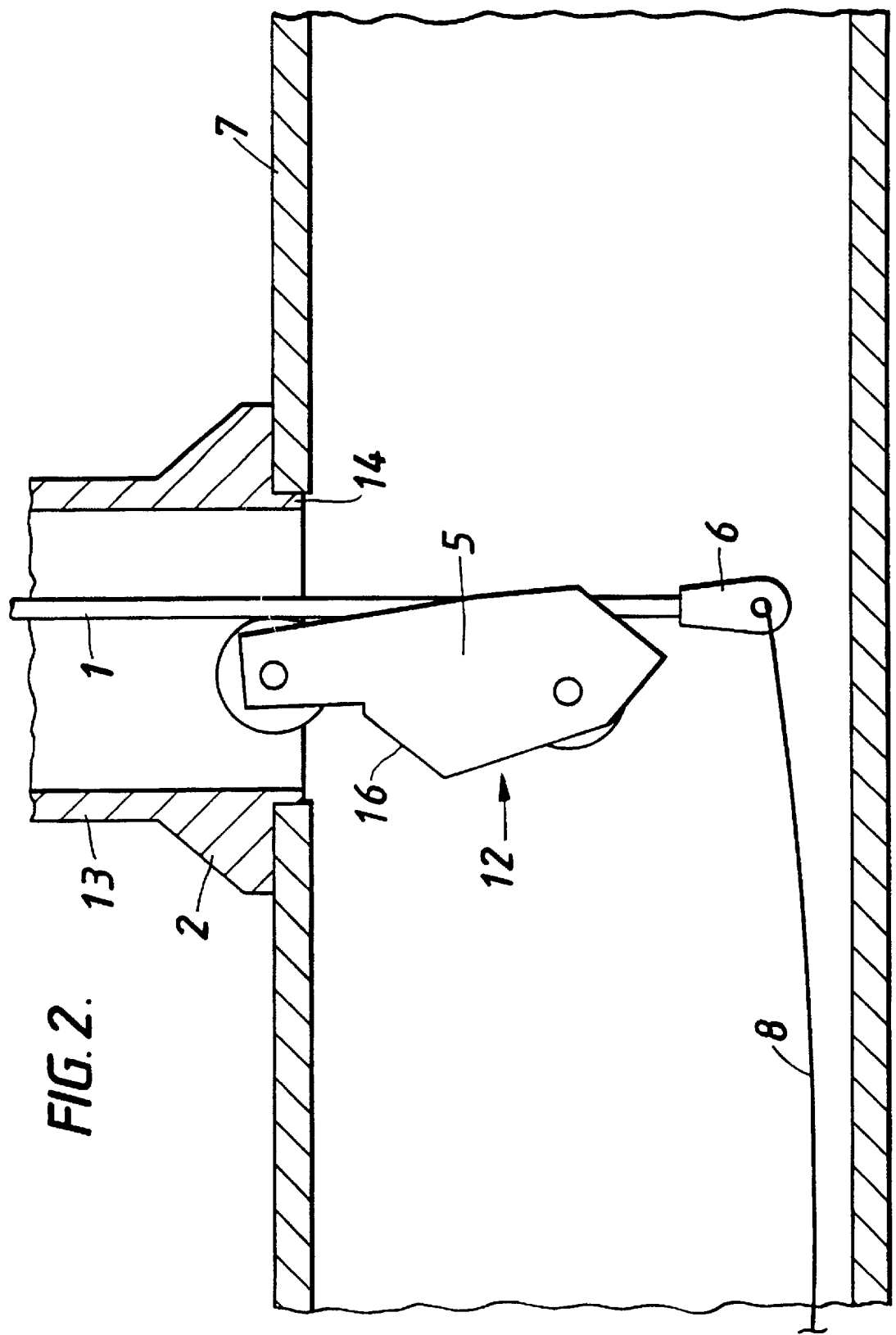
FIG. 2 shows the arrangement abutting the pipe hole.

The tow cable 1 is fixed to the termination 6 prior to mounting and the retaining pin 20 prevents the cable from slipping out from pulley 4 and the guide. As shown, arms 5 are in a substantially vertical position and on lowering of the support 13, the guide device 12 slips easily through the aperture 15 in the pipe 7 until the saddle 2 comes to rest on the pipe wall as shown in FIG. 2 with the extension shoulder 14 in the aperture.

At this stage the pulley arms are still substantially vertical and the guide wire 8 will be pulled back from the hole in the pipe at the end of the sector to bring with it the tow cable 1.

Figure 3:
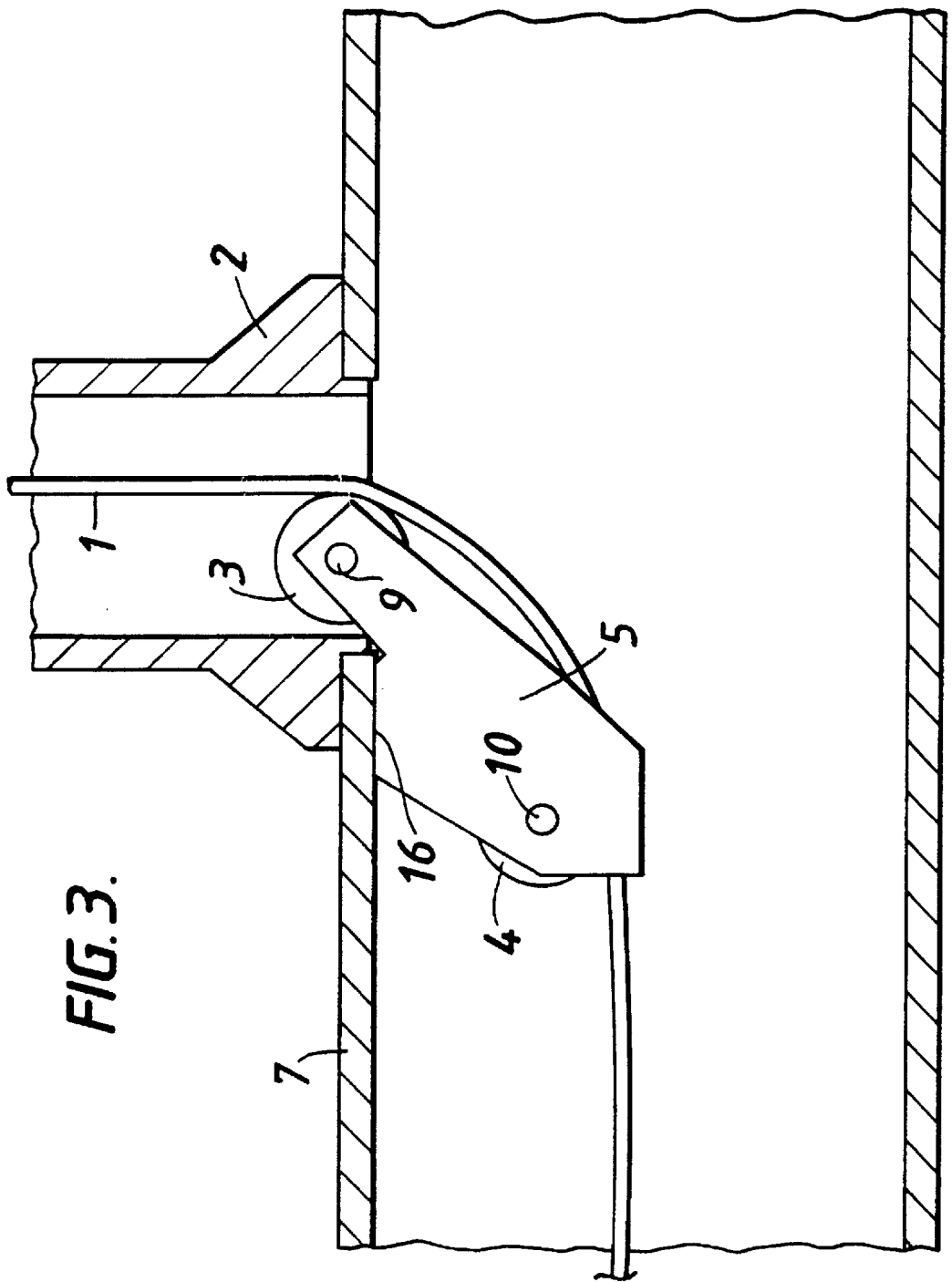
FIG. 3 shows the arrangement in the towing position.

As the guide wire 8 is pulled and the slack taken up, the guide device 12 will automatically move to the second position shown in FIG. 3. This occurs due to the pulling action causing arms 5 to pivot about axle 9 and the cable 1 fully engages both pulleys 4 and 3 as it is tensioned. Further pivoting of the arms is prevented when angled face 16 abuts the wall of the pipeline.

Once the tow cable reaches the remote hole in the pipe (which can also carry its own guide and support assemblies) the inspection or other device can be added and the tow cable employed along the sector.

In this configuration the vertical upward towing force (supplied by a winch, for example) is reacted down the support between the saddle of the support 1 and the pulley arms 5 in a scissors action. The horizontal towing force is reached by the support saddle bearing against the left hand side of the access hole in the FIG. 3 arrangement.

Hence the guide assists in the movement along the pipeline and prevents damage to the cable around the entry point.

In the case of operation on a pipe carrying fluid, a sealable chamber will be required to prevent escape of the fluid from the pipeline. Such an arrangement is shown in FIGS. 4 and 5.

Figure 4:
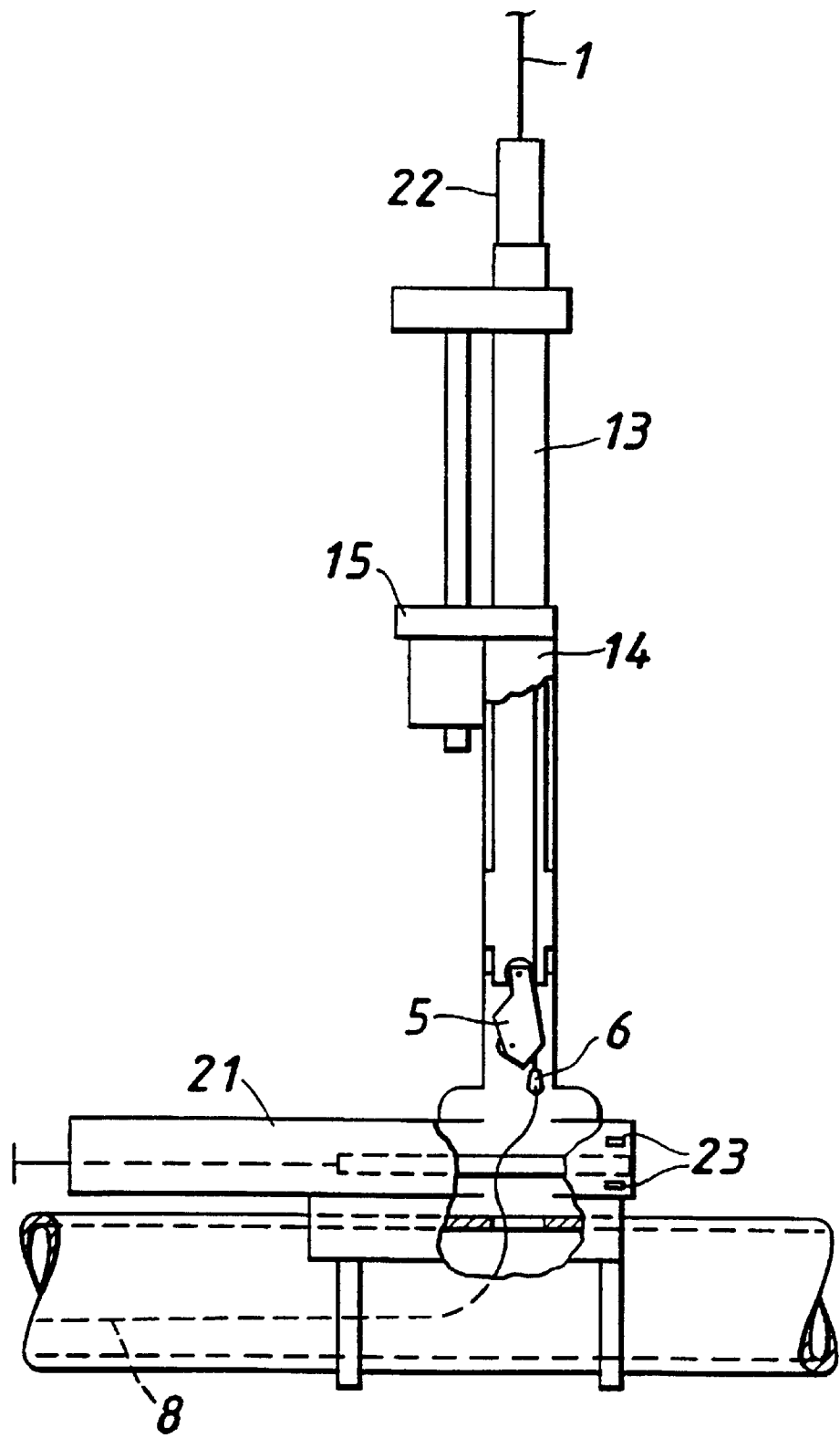
FIG. 4 shows an alternative arrangement with a seal attachment to allow insertion when the pipe is carrying fluid.
Figure 5:
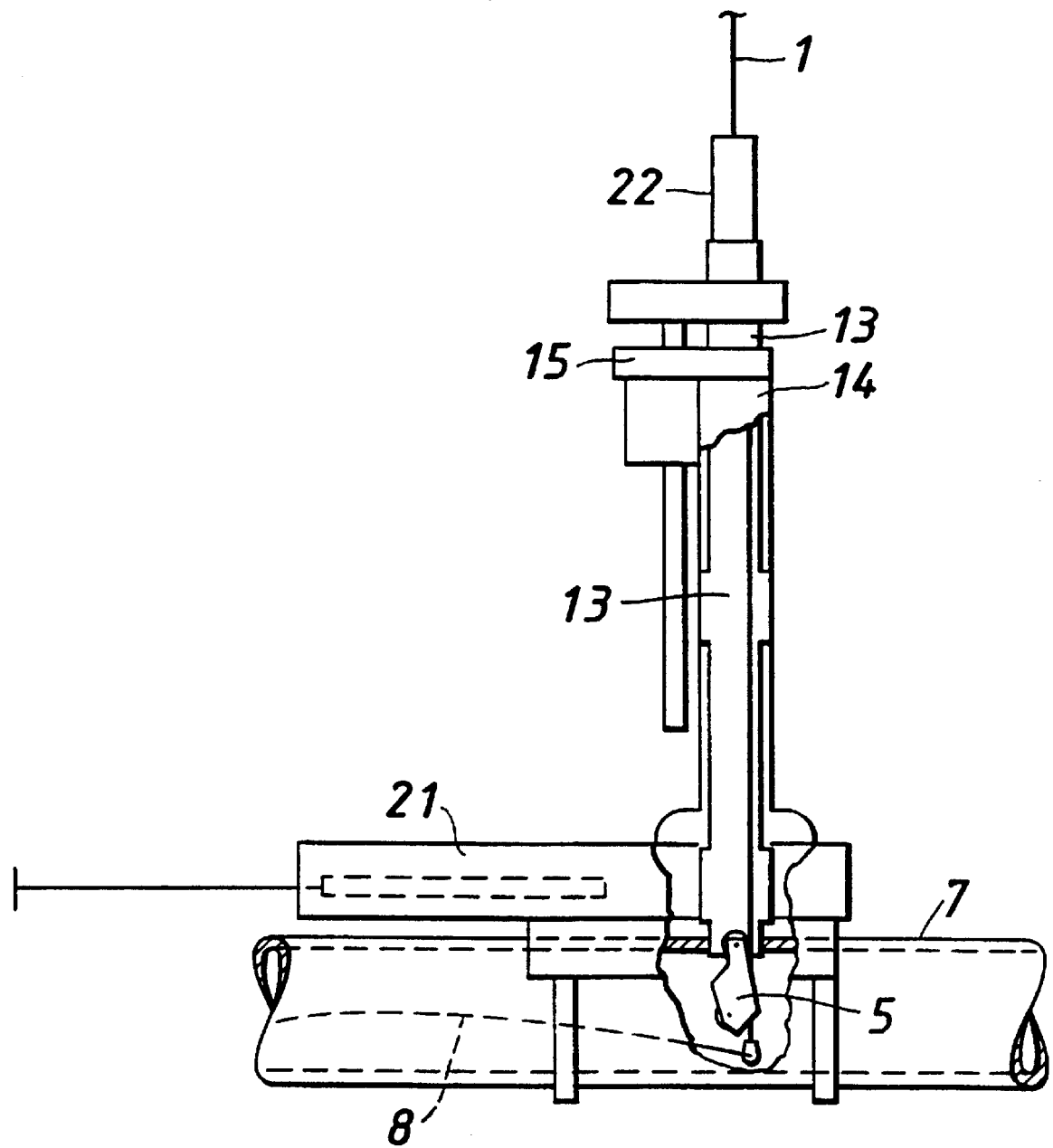
FIG. 5 shows the arrangement following lowering of the cable guide into the pipe.

In the FIG. 4 arrangement, the support 13 is in the form of an elongate inner tube within an outer pressure tube 14. The cable 1 extends externally via a running seal 22. The inner tube 13 can be moved by means of a jacking mechanism 15.

The arrangement is mounted on a slide valve 21 which covers the pipe aperture to seal the pipe. The slide valve includes an equalising valve 23. The slide valve will be in place in the closed position as shown in FIG. 4 before operation of the insertion of the guide.

The cable guide wire has been attached to the towing cable termination 6. The pressure between the pipe and the pressure containing tube 14 is equalised by opening the slide valve equalisation valve 23. The running seal 22 seals against the towing cable to prevent leakage.

The slide valve 21 is then opened and the inner tube 13 is moved down against the pressure by the jacking mechanism 15 as shown in FIG. 5.

The guide device 12 attached to the inner tube 13 moves into the pipe 7 and as the guide wire 8 is pulled and the slack taken up, the guide device 12 will automatically move under pivoting action into the position similar to that shown in FIG. 3 above, abutting the pipe wall.

Although the arrangement has been described in relation to pipelines it is suitable for other ducts or conduits and indeed can be used solely for the purpose of introducing into a conduit a heavyweight electrical cable, for example.

What is claimed is:

1. Apparatus for guiding a cable through a conduit and comprising:

a guide device for receiving a cable, means for allowing passage of the cable through the guide device and means responsive to a pulling force on the cable for automatically moving the guide device from a first position to a second position during passage of the cable into the conduit to assist in the movement of the cable along the conduit.

2. Apparatus as claimed in claim 1 wherein pivot means are provided to allow the guide device to move through an arc as a result of forces on the cable.

3. Apparatus as claimed in claim 2 wherein the pivot moves the guide device from a generally vertical position to an intermediate position in use.

4. Apparatus as claimed in claim 1, including pulley means for assisting in the travel of the cable along the conduit.

5. Apparatus as claimed in claim 1 including means for supporting the guide means externally of the conduit.

6. Apparatus as claimed in claim 5 wherein the support means includes a saddle portion and shoulder portion.

7. Apparatus for guiding a cable through a conduit and comprising a guide device for receiving a cable, means for allowing passage of the cable through the guide device means responsive to a pulling force on the cable for automatically moving the guide device from a first position to a second position during passage of the cable into the conduit to assist in the movement of the cable along the conduit, means for providing a seal to the conduit to allow insertion of the guide device into a fluid carrying conduit, and lowering means to control the positioning of the guide device against the pressure of the fluid.

8. A method for guiding a cable through a conduit and comprising the steps of:

passing the cable through a guide device, lowering the guide device into the conduit, and automatically moving the guide device from a first to a second position due to a pulling force on the cable to assist in the movement of the cable along the conduit.

9. A method as claimed in claim 8 including supporting the guide device externally of the conduit.

10. A method as claimed in claim 8 including the step of providing a seal between the conduit and the lowered guide device to allow operation when the conduit is carrying fluid.

11. Apparatus for guiding a cable through a conduit and comprising:

a guide device for receiving a cable, means for allowing passage of the cable through the guide device and pivot means responsive to a force on the cable for automatically pivoting the guide device through an arc from a first position to a second position during passage of the cable into the conduit to assist in the movement of the cable along the conduit.

* * * * *